(12) United States Patent
Kim et al.

(10) Patent No.: US 9,205,765 B2
(45) Date of Patent: Dec. 8, 2015

(54) RECLINER FOR VEHICLE SEAT

(71) Applicants: Sung-Chul Kim, Gyeongsangbuk-Do (KR); Jae-Ho Kim, Gyeongsangbuk-Do (KR)

(72) Inventors: Sung-Chul Kim, Gyeongsangbuk-Do (KR); Jae-Ho Kim, Gyeongsangbuk-Do (KR)

(73) Assignee: DAS CO., LTD., Gyeongsangbuk-Do (KR)

( * ) Notice: Subject to any disclaimer, the term of this patent is extended or adjusted under 35 U.S.C. 154(b) by 0 days.

(21) Appl. No.: 14/374,176

(22) PCT Filed: Jun. 26, 2014

(86) PCT No.: PCT/KR2014/005719
§ 371 (c)(1),
(2) Date: Jul. 23, 2014

(87) PCT Pub. No.: WO2014/209047
PCT Pub. Date: Dec. 31, 2014

(65) Prior Publication Data
US 2015/0298583 A1    Oct. 22, 2015

(30) Foreign Application Priority Data
Jun. 27, 2013    (KR) .................. 10-2013-0074568

(51) Int. Cl.
*B60N 2/20* (2006.01)
*B60N 2/225* (2006.01)

(52) U.S. Cl.
CPC .................. *B60N 2/2252* (2013.01)

(58) Field of Classification Search
USPC ...................................................... 297/362
See application file for complete search history.

(56) References Cited

U.S. PATENT DOCUMENTS

| | | | | |
|---|---|---|---|---|
| 5,634,380 | A * | 6/1997 | Scholz et al. | 297/362 X |
| 6,918,635 | B2 * | 7/2005 | Finner et al. | 297/362 |
| 7,314,250 | B1 * | 1/2008 | Eblenkamp et al. | 297/362 |
| 7,461,900 | B2 * | 12/2008 | Lange | 297/362 X |
| 7,497,519 | B2 * | 3/2009 | Dill et al. | 297/362 |
| 7,753,450 | B2 * | 7/2010 | Eppert et al. | 297/362 |
| 7,878,593 | B2 * | 2/2011 | Nae | 297/362 |
| 8,360,525 | B2 * | 1/2013 | Cha et al. | 297/362 |
| 8,915,548 | B2 * | 12/2014 | Stilleke et al. | 297/362 X |
| 8,950,811 | B2 * | 2/2015 | Narita et al. | 297/362 |
| 9,033,418 | B2 * | 5/2015 | Jokiel et al. | 297/362 |
| 2006/0279121 | A1 * | 12/2006 | Matsumoto et al. | 297/362 |
| 2006/0290187 | A1 * | 12/2006 | Scholz et al. | 297/362 |
| 2007/0290540 | A1 * | 12/2007 | Voss et al. | 297/362 |
| 2009/0102265 | A1 * | 4/2009 | Eppert et al. | 297/362 |
| 2009/0224588 | A1 * | 9/2009 | Matsumoto et al. | 297/362 |
| 2010/0201174 | A1 * | 8/2010 | Ito | 297/362 |
| 2012/0001470 | A1 * | 1/2012 | Vogel | 297/362 |

(Continued)

*Primary Examiner* — Rodney B White
(74) *Attorney, Agent, or Firm* — Tarolli, Sundheim, Covell & Tummino LLP

(57) ABSTRACT

Disclosed herein is a recliner for a vehicle seat including an external gear bracket having an external gear, an internal gear bracket having an internal gear, a socket provided with a socket protrusion and an operation protrusion, a cam sleeve configured to surround a central protrusion, and a pair of wedge blocks configured to surround of an outer peripheral surface the central protrusion, wherein a protrusion portion is formed from the cam sleeve toward each of the wedge blocks and a groove portion in which the protrusion portion is moved during operation of the wedge block is formed at an end portion of the wedge block. Accordingly, it may possible to obtain uniform actuation force by configuring the recliner such that a gap is always present between the pressed wedge block and the bush.

4 Claims, 8 Drawing Sheets

(56) References Cited

U.S. PATENT DOCUMENTS

| | | |
|---|---|---|
| 2012/0007402 A1* | 1/2012 | Stilleke et al. ............... 297/362 |
| 2012/0074752 A1* | 3/2012 | Thiel ............................. 297/362 |
| 2012/0169104 A1* | 7/2012 | Stilleke et al. ............... 297/362 |
| 2012/0223562 A1* | 9/2012 | Assmann et al. ............. 297/362 |
| 2013/0009439 A1* | 1/2013 | Jokiel et al. .................. 297/362 |
| 2013/0106161 A1* | 5/2013 | Ohba et al. ................... 297/362 |
| 2013/0207433 A1* | 8/2013 | Lehmann et al. ............. 297/362 |
| 2013/0214578 A1* | 8/2013 | Stilleke et al. ............... 297/362 |
| 2014/0001806 A1* | 1/2014 | Golarz .......................... 297/362 |
| 2014/0361594 A1* | 12/2014 | Thiel ............................ 297/362 |

* cited by examiner

RECLINER FOR VEHICLE SEAT

CROSS-REFERENCE(S) TO RELATED APPLICATIONS

The present invention is a U.S. National Stage under 35 USC 371 patent application, claiming priority to Serial No. PCT/KR2014/005719, filed on 26 Jun. 2014; which claims priority from Korean Patent Application No. 10-2013-0074568 filed on Jun. 27, 2013, both of which are incorporated herein by reference in their entirety.

BACKGROUND OF THE INVENTION

1. Field of the Invention

Exemplary embodiments of the present invention relate to a recliner for a vehicle seat, and more particularly, to a recliner for a vehicle seat configured to form protrusion portions at both end portions of a cam sleeve and form groove portions, in which the protrusion portions are movable, on wedge blocks, such that a predetermined gap is continuously maintained between the cam sleeve and a pressing protrusion of each wedge block during operation of the recliner.

2. Description of the Related Art

In general, a vehicle is equipped with a seat back, which is pivotable relative to a seat cushion by forming the seat back as a hinge structure, and a recliner allowing the seat back to be mutually switched from a locked state of being fixed to the seat cushion at a certain angle to an unlocked state of being pivotable relative to the seat cushion. That is, a passenger may adjust an angle of the seat back according to the body form or convenience thereof by operation of the recliner.

Such recliners are classified into a lever type recliner in which, when an operation lever is operated, a recliner is unlocked so that a seat back is pushed by a passenger's back to adjust an angle of the seat back, and a rotary type recliner which adjusts an angle of a seat back by turning an operation knob in the form of a dial.

Among the recliners, the rotary type recliner is disclosed in Japanese Patent Laid-Open Publication No. 2010-253101 (Patent Document 1). FIG. 1 shows an example of a conventional rotary type recliner.

As shown in the drawing, a conventional recliner 10 includes a shaft 11, an external gear bracket 12, an internal gear bracket 13, a socket 14, a bush 15, a plate cover 16, a guide ring 17, and a power transmission unit 20.

The external gear bracket 12 is formed, at a center thereof, with a fitting hole 12a, while being formed, at an inside surface thereof, with an external gear 12b.

The internal gear bracket 13 is formed, at a center thereof, with a central protrusion 13a protruding therefrom, while being formed, at a circumferential surface thereof, with an internal gear 13b which selectively engages with the external gear 12b. The internal gear 13b has the number of gear teeth less than the number of those of the external gear 12b.

The socket 14 is formed, at a center thereof, with a coupling hole 14a through which the shaft 11 passes so that the shaft 11 is spline-coupled to the socket 14. The socket 14 is formed, at one side surface thereof, with a socket protrusion 14b protruding therefrom so that the socket protrusion 14b is inserted into the central protrusion 13a of the internal bracket 13. The socket 14 is provided with a spring protrusion 14d protruding in a direction opposite to the socket protrusion 14b such that a wedge spring 23 is seated to the spring protrusion 14d.

The bush 15 is press-fitted and coupled to the fitting hole 12a of the external gear bracket 12.

The power transmission unit 20 rotates the external gear bracket 12 relative to the internal gear bracket 13. The power transmission unit 20 includes a cam sleeve 22 surrounding a portion of an outer peripheral surface of the central protrusion 13a, a pair of wedge blocks 21 provided between the cam sleeve 22 and the bush 15, and a wedge spring 23 which is fitted and installed between the pair of wedge blocks 21 by bending both ends of the wedge spring 23 so as to press the individual wedge blocks 21 in a direction away from each other.

The cam sleeve 22 has a semicircular shape and is configured such that an inner peripheral surface thereof surrounds a portion of the outer peripheral surface of the central protrusion 13a.

The pair of wedge blocks 21 is provided and each of the wedge blocks 21 has a wedge shape in which a width is narrowed from one end portion adjacent to each other to the other end portion. The pair of wedge blocks 21 perform a locking function preventing rotation of the external gear bracket 12 in a state in which the angle adjustment of the seat back is completed, and the respective one end portions thereof are spaced to face each other in an eccentric space defined between the outer peripheral surface of the central protrusion 13a of the internal gear bracket 13 and an inner peripheral surface of the bush 15.

The other end portion of each wedge block 21 serves to press an end portion of the cam sleeve 22 during operation of the recliner in order to adjust the angle of the seat back and is provided with a pressing protrusion 21a protruding toward the central protrusion 13a of the internal gear bracket 13.

The plate cover 16 encloses one surface (a front surface in FIG. 1) of the external gear bracket 12 so as to prevent decoupling of the socket 14 and the power transmission unit 20 therefrom.

The guide ring 17 surrounds the external gear bracket 12, the internal gear bracket 13, and an outer peripheral surface of the plate cover 16 so that they are integrally coupled.

As shown in FIG. 2, the pair of wedge blocks 21 is configured such that a uniform gap is each formed between respective pressing protrusions 21a and both end portions of the cam sleeve 22.

During operation of the recliner in this state, when the socket 14 presses and rotates any one wedge block (shown in the left in FIG. 2 for example) of the pair of wedge blocks 21, the left wedge block 21 is decoupled in the eccentric space to be unlocked so that the left wedge block 21 and cam sleeve 22 are rotated while a clearance is maintained between the other wedge block 21 and the cam sleeve 22.

Meanwhile, when operation force is removed in a rotated state of the wedge block 21 and the cam sleeve 22, the gap between the pressing protrusion 21a of the left wedge block 21 and the end portion of the cam sleeve 22 is maintained while the left wedge block 21 pressing the cam sleeve 22 is slightly rotated in a counterclockwise direction by elastic force of the wedge spring 23.

However, when the same centers of the external gear bracket 12 and the internal gear bracket 13 are changed by a deviation, a deviation of an axial distance is present therebetween. For this reason, even when the operation force is released by the deviation of an axial distance, a phenomenon occurs in which no gap between the pressing protrusion 21a of the wedge block 21 and the end portion of the cam sleeve 22 is present in at least one of the pair of wedge blocks 21. As such, since the gap between the pressing protrusion 21a of the wedge block 21 and the end portion of the cam sleeve 22 is not present, actuation force for rotating the cam sleeve 22 is additionally required in addition to actuation force for releasing the wedge blocks 21 from the locked state when the recliner is operated to again adjust the angle of the seat back. Consequently, there is a problem in that overall initial actuation force of the recliner is rapidly increased.

[Patent Document 1] Japanese Patent Laid-Open Publication No. 2010-253101

SUMMARY OF THE INVENTION

An object of the present invention is to provide a recliner for a vehicle seat configured to continuously maintain a predetermined gap between a cam sleeve and a pressing protrusions of each wedge block during operation of the recliner, so as to be capable of preventing a phenomenon in which initial actuation force required when the wedge block is unlocked in order to adjust an angle of a seat back is rapidly increased.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a recliner for a vehicle seat includes an external gear bracket formed with a through-hole to which a bush is fitted and coupled, the external gear bracket having an external gear, an internal gear bracket which has an internal gear engaging with the external gear and is formed with a central protrusion protruding toward the external gear bracket, a shaft passing through the central protrusion, a socket provided with a socket protrusion to which the shaft is spline-coupled, and provided with an operation protrusion which protrudes to surround a portion of an outer peripheral surface of the central protrusion, wherein the socket protrusion is formed toward the internal gear bracket, a cam sleeve configured to surround a portion of the remainder of the outer peripheral surface of the central protrusion, and a pair of wedge blocks configured to surround a portion of the outer peripheral surface of the central protrusion in a state in which one end portions of the respective wedge blocks face each other, and the other end portions thereof are pressed by the operation protrusion, wherein the cam sleeve includes protrusion portions protruding from both end portions thereof toward the wedge blocks, the pair of wedge blocks includes groove portions in which the protrusion portions are moved on inner peripheral surfaces adjacent to the other respective end portions, and when pressing force by the operation protrusion is released, a predetermined gap is each formed between lower side surfaces of the groove portions and lower side surfaces of the protrusion portions of the cam sleeve.

In addition, in a state of being assembled to a vehicle, when an angle between an upper side surface of each of the protrusion portions and an upper side surface of each of the groove portions refers to "$a_1$" and an angle between a lower side of the protrusion portion and a lower side of the groove portion refers to "$a_2$", $a_2 > a_1$ may be satisfied.

In addition, the predetermined gap may be equal to or greater than a difference of the angles $a_1$ and $a_2$.

In addition, the recliner may be configured such that, when any one of the pair of wedge blocks is pressed by the operation protrusion during rotation of the socket, the groove portion of the other wedge block presses the associated protrusion portion of the cam sleeve before the one wedge block presses the cam sleeve.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
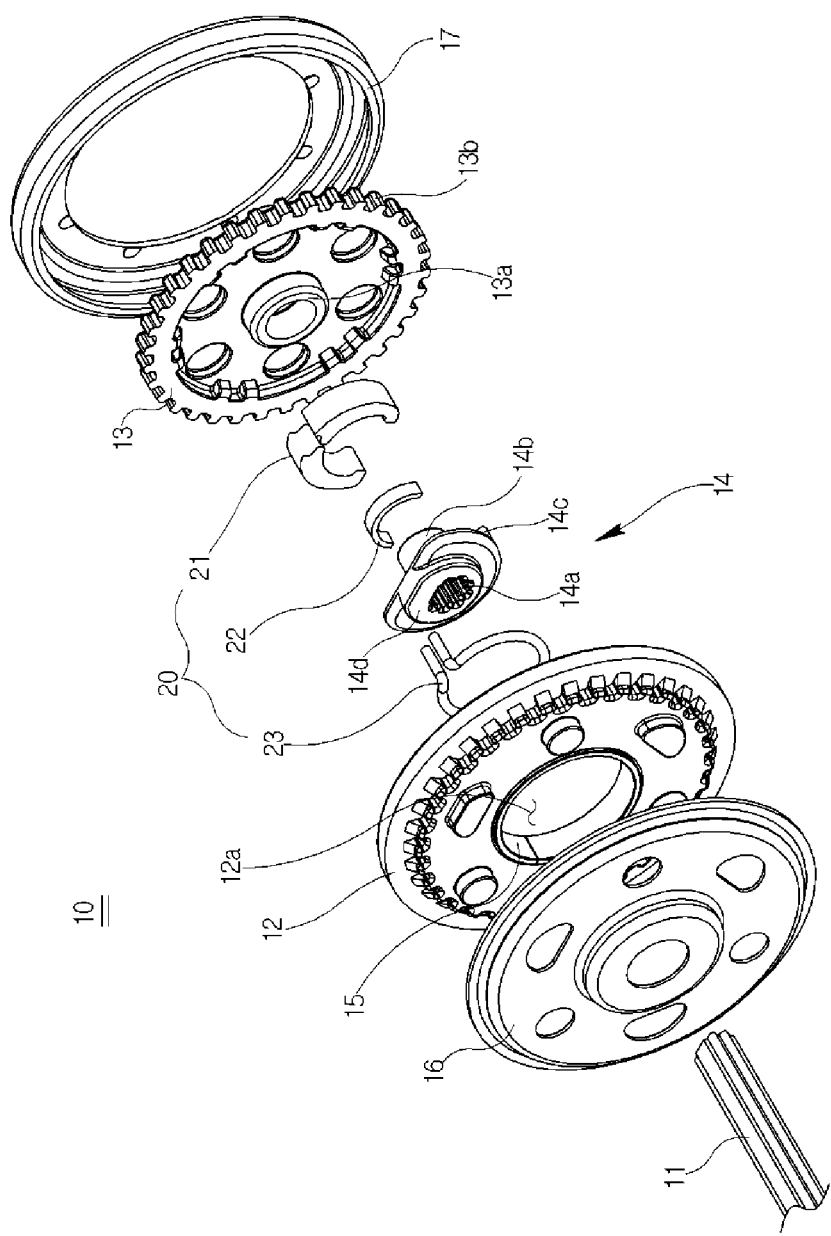
FIG. 1 is an exploded perspective view illustrating a conventional recliner for a vehicle seat.

Exemplary embodiments of the present invention will be described below in more detail with reference to the accompanying drawings. In addition, the thickness of each line or the size of each component illustrated in the drawings may be exaggerated for convenience of description and clarity. Moreover, terms to be described later are terms defined in consideration of functions of the present invention, and these may vary with the intention or practice of a user or an operator. Therefore, such terms should be defined based on the entire content disclosed herein.

Figure 3:
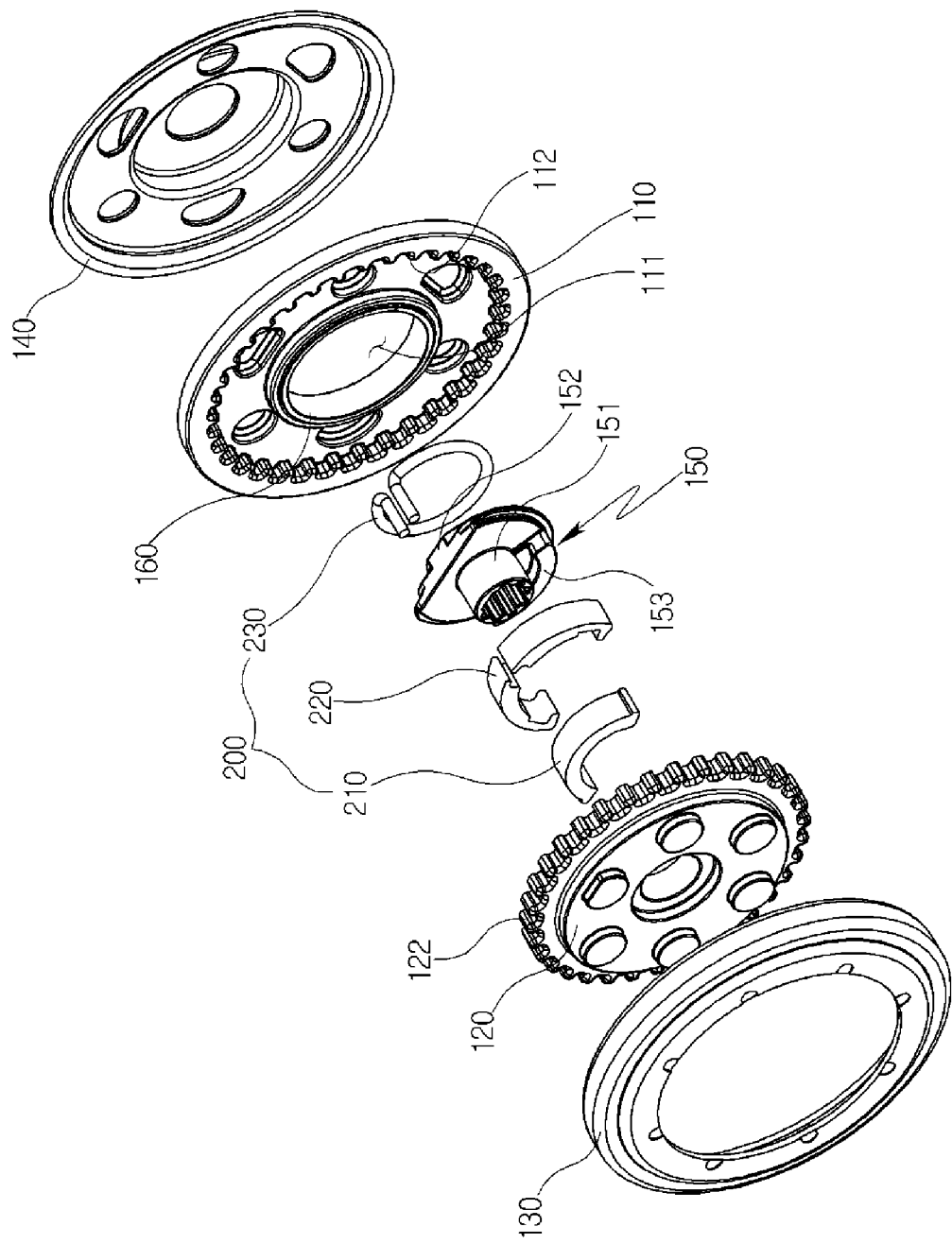
FIG. 3 is an exploded perspective view illustrating a recliner for a vehicle seat according to an embodiment of the present invention.
Figure 4:
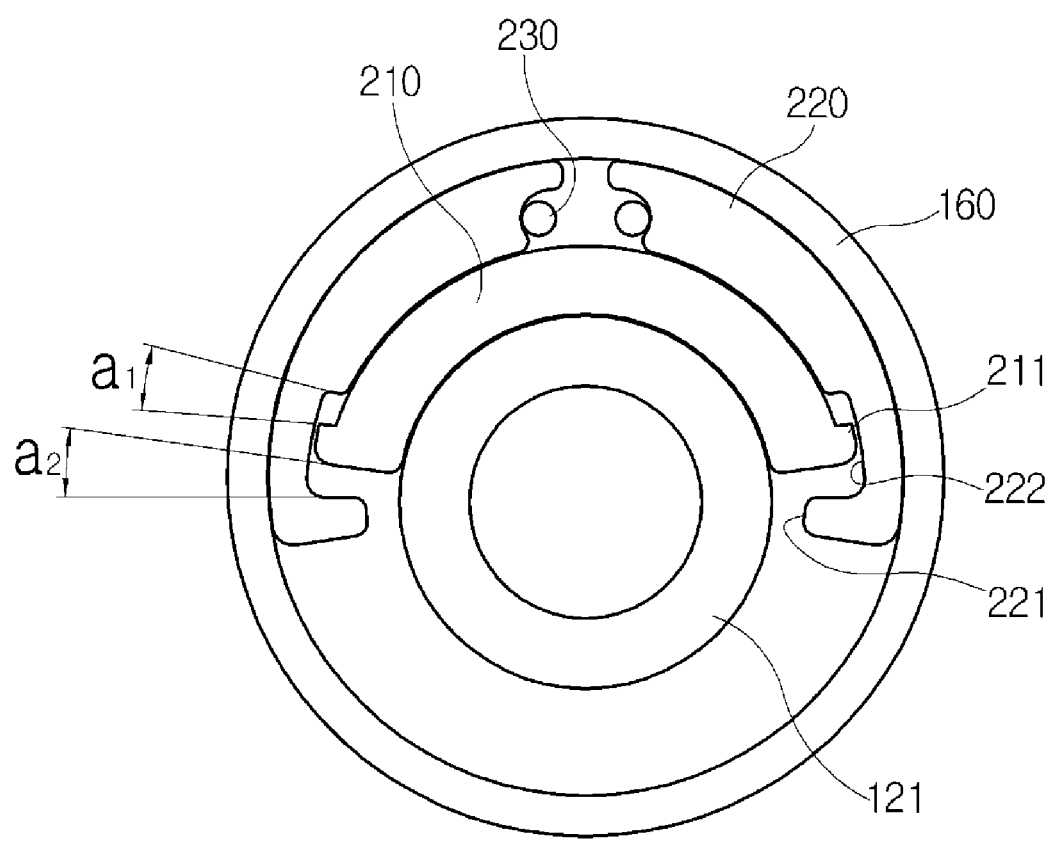
FIG. 4 is a planar cross-sectional view illustrating a coupled state of a cam sleeve, wedge blocks, a central protrusion, and a bush in the recliner of FIG. 3.
Figure 5:
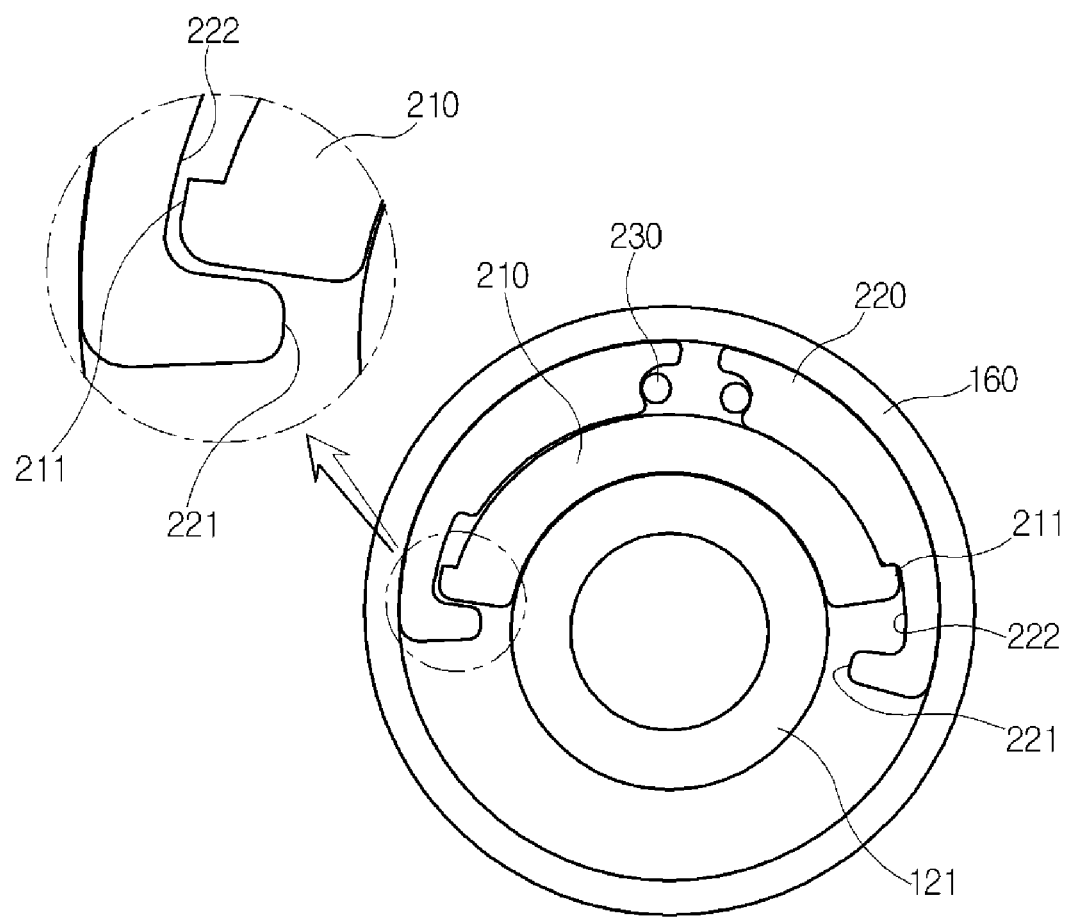
FIGS. 5 and 6 are planar cross-sectional views illustrating an operation state of the wedge blocks and the cam sleeve of FIG. 4.
Figure 6:
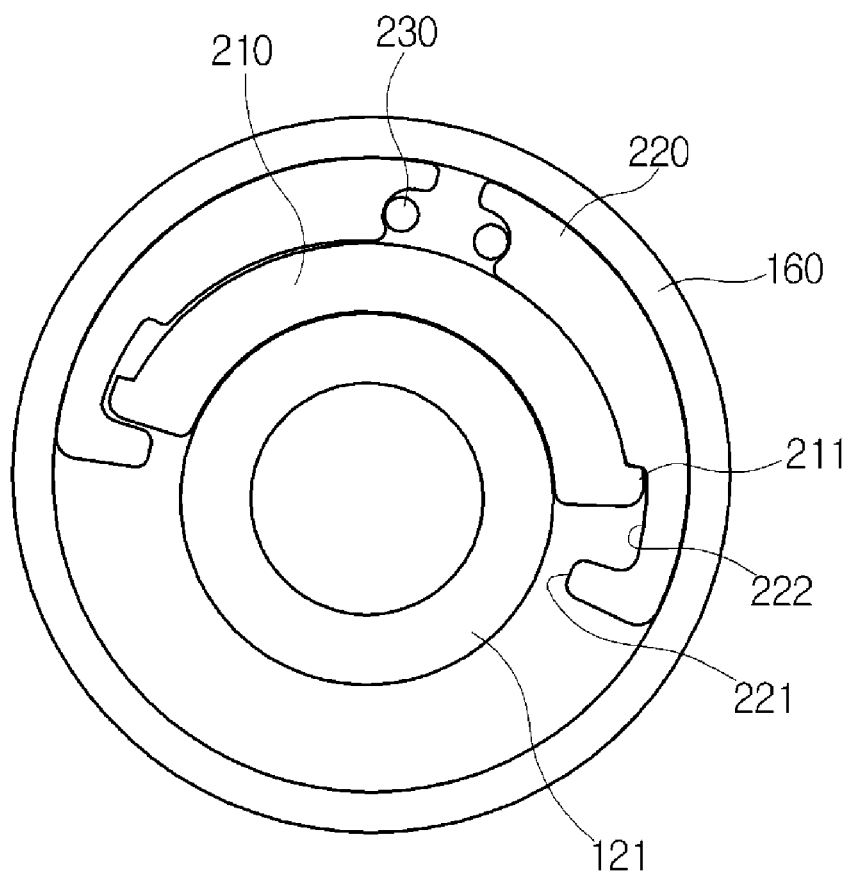
Figure 7:
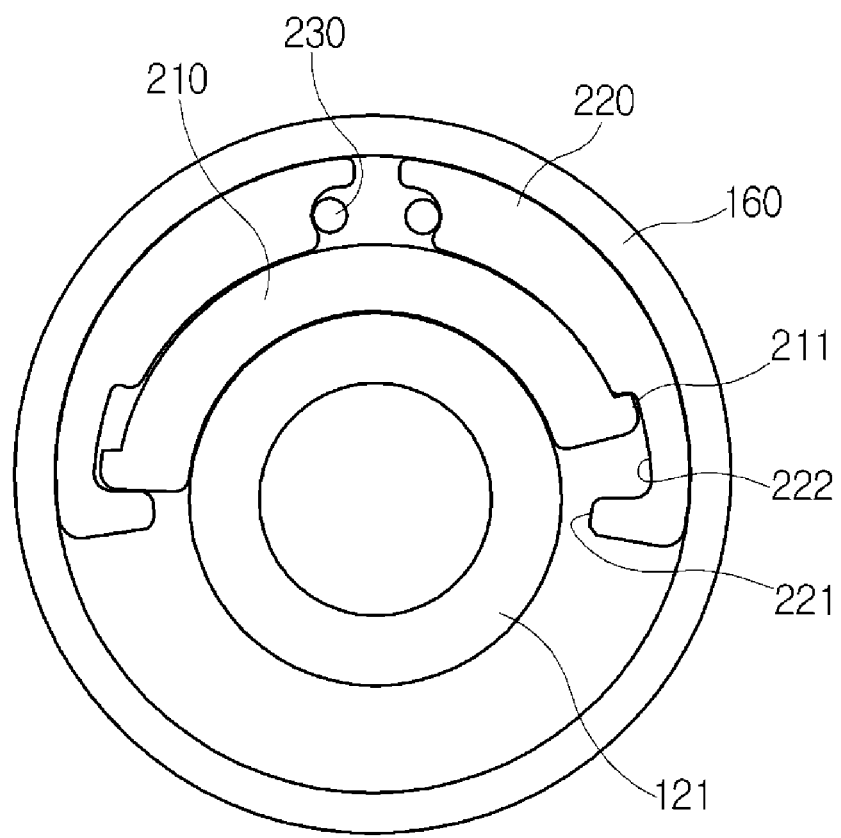
FIGS. 7 and 8 are planar cross-sectional views illustrating the operation state of the wedge blocks and the cam sleeve in a contact state therebetween in the recliner according to the embodiment of the present invention.
Figure 8:
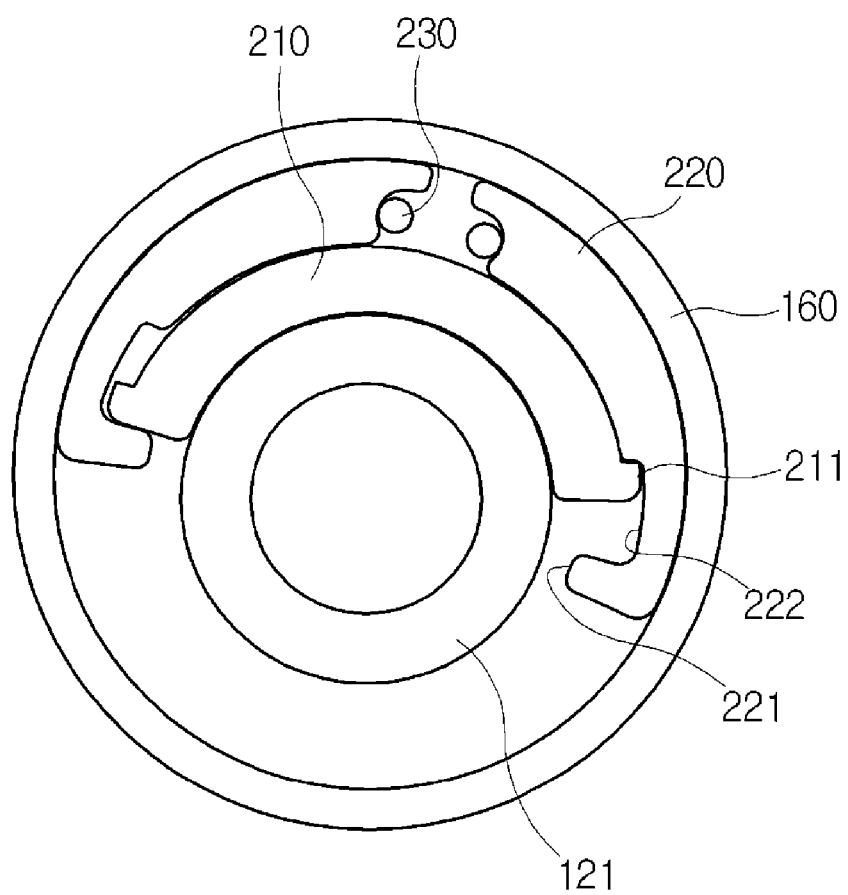

FIG. 3 is an exploded perspective view illustrating a recliner for a vehicle seat according to an embodiment of the present invention. FIG. 4 is a planar cross-sectional view illustrating a coupled state of a cam sleeve, wedge blocks, a central protrusion, and a bush in the recliner of FIG. 3. FIGS. 5 and 6 are planar cross-sectional views illustrating an operation state of the wedge blocks and the cam sleeve of FIG. 4. FIGS. 7 and 8 are planar cross-sectional views illustrating the operation state of the wedge blocks and the cam sleeve in a contact state therebetween in the recliner according to the embodiment of the present invention.

As shown in the drawings, a recliner for a vehicle seat 100 according to an embodiment of the present invention includes an external gear bracket 110, an internal gear bracket 120, a guide ring 130, a plate cover 140, a socket 150, a bush 160, and a power transmission unit 200.

The power transmission unit 200 of the recliner 100 includes a cam sleeve 210, wedge blocks 220, and a wedge spring 230. The power transmission unit 200 has a structure in which protrusion portions 211 are formed at both end portions of the cam sleeve 210 and groove portions 222 for movement of the protrusion portions 211 are formed on the wedge blocks 220, so that a gap is always present between the wedge blocks 220 and the bush 160 during operation of the recliner 100.

The shaft couples a back frame (not shown), which is coupled with a seat back, to a cushion frame (not shown), which is coupled with a seat cushion, and supports the back frame such that the back frame is rotatable relative to the cushion frame.

Each of both ends of the shaft is provided with the recliner 100 and an operation means is provided outside the recliner 100. Here, the operation means may be configured of a motor capable of rotating the shaft or be configured of an operation knob in the form of a dial capable of being turned by an operator's hand.

The external gear bracket 110 is coupled to the back frame and is formed, at a center thereof, with a through-hole 111 to which the shaft is fitted. An external gear 112 has a plurality of gear teeth continuously formed on an inside surface of the external gear bracket 110 along a circumferential direction thereof.

The internal gear bracket 120 is coupled to the cushion frame, and is formed, at a center thereof, with a central protrusion 121 protruding toward the external gear bracket 110. The central protrusion 121 of the internal gear bracket 120 is formed with a fitting hole to which a socket protrusion 151 of the socket 150 to be described later is fitted.

An internal gear 122, which selectively engages with the external gear 112, is continuously formed on an outer peripheral surface of the internal gear bracket 120 along a circumferential direction thereof. The internal gear 122 has the number of gear teeth less than the number of those of the external gear 112.

The central protrusion 121 of the internal gear 122 has a pipe shape such that the shaft is fitted to and passes through the central protrusion 121.

Meanwhile, the present invention may also be configured such that the internal gear bracket 120 is coupled to the back frame and the external gear bracket 110 is coupled to the cushion frame.

The socket 150 is formed, at a center thereof, with a coupling hole through which the shaft is spline-coupled to the socket 150. An edge of the coupling hole of the socket 150 is formed with a socket protrusion 151 protruding from one side surface of the socket 150 such that the socket protrusion 151 is fitted to the fitting hole of the internal gear bracket 120. That is, the socket protrusion 151 protrudes toward the internal gear bracket 120 from a center of one side surface of the socket 150, and the shaft passes through the socket protrusion 151 to be spline-coupled to the socket 150 through the coupling hole formed thereon. The other side surface of the socket 150 is formed with a spring protrusion 152 directed toward the external gear bracket 110.

The socket 150 is formed with an operation protrusion 153 protruding therefrom such that the operation protrusion 153 partially surrounds an outer peripheral surface of the central protrusion 121 formed at the internal gear bracket 120 and presses the wedge blocks 220 to be described later.

The bush 160 is made of a metal material and is press-fitted and coupled to the through-hole 111 of the external gear bracket 110.

Figure 2:
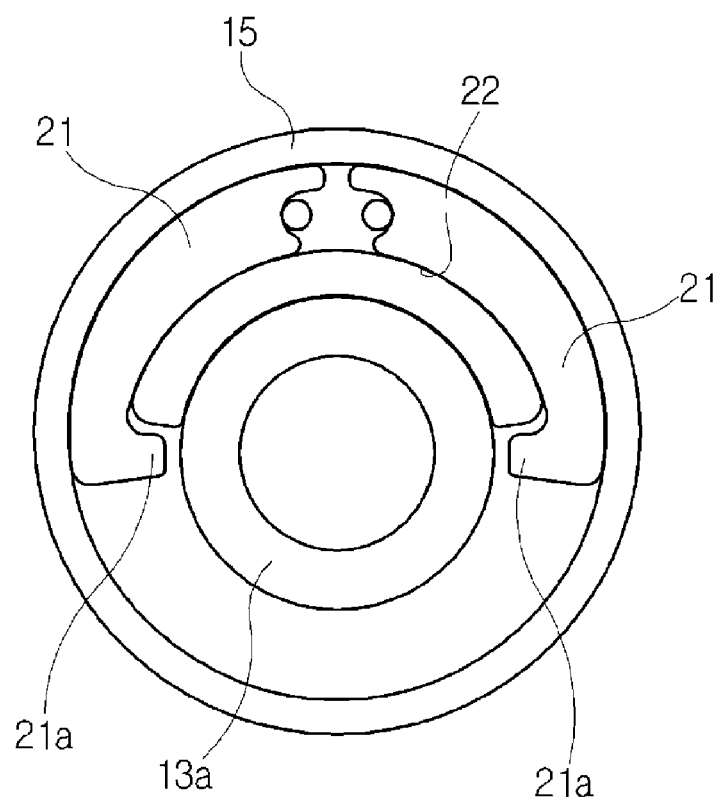
FIG. 2 is a planar cross-sectional view illustrating an operation relation between a socket, wedge blocks, and a cam sleeve in the recliner of FIG. 1.

The plate cover 140 encloses one surface (a rear surface in FIG. 2) of the external gear bracket 110 so as to prevent decoupling of the socket 150, the bush 160, and the power transmission unit 200 therefrom.

The guide ring 130 surrounds the external gear bracket 110 and an outer peripheral surface of the internal gear bracket 120 so that they are integrally coupled.

The power transmission unit 200 transmits torque generated by the operation means coupled to the shaft to the external gear bracket 110 via the internal gear bracket 120. The power transmission unit 200 includes a cam sleeve 210, a pair of wedge blocks 220, and a wedge spring 230.

The cam sleeve 210 has a circular arc shape so as to surround a portion of the outer peripheral surface of the central protrusion 121 of the internal gear bracket 120. The cam sleeve 210 is configured such that a uniform gap is each formed between both end portions of the cam sleeve 210 and pressing protrusions 221 of the wedge blocks 220 to be described later.

The pair of wedge blocks 220 is provided between the internal gear bracket 120 and the socket 150. The pair of wedge blocks 220 surrounds the outer peripheral surface of the central protrusion 121 of the internal gear bracket 120. That is, the pair of wedge blocks 220 wholly surrounds the outer peripheral surface of the central protrusion 121 of the internal gear bracket 120, together with the operation protrusion 153 of the socket 150.

Each of the wedge blocks 220 has substantially one-fourth circular arc shape. The pair of wedge blocks 220 is installed to face each other and each has a wedge shape in which a width is narrowed from one end portion adjacent to each other to the other end portion. The pair of wedge blocks 220 is supported in such a way that a bent end portion of the wedge spring 230 to be described later is fitted between one end portions of the wedge blocks 220 adjacent to each other. The other end portions of the pair of wedge blocks 220 are respectively supported by both end portions of the operation protrusion 153 of the socket 150.

The cam sleeve 210 having a circular arc shape is provided between the pair of wedge blocks 220 and the central protrusion 121 of the internal gear bracket 120. The cam sleeve 210 comes into contact with each of the outer peripheral surface of the central protrusion 121 of the internal gear bracket 120 and inner peripheral surfaces of the pair of wedge blocks 220.

The other end portions of the pair of wedge blocks 220 are respectively provided with the pressing protrusions 221 which protrude toward the central protrusion 121 of the internal gear bracket 120. Accordingly, when the recliner 100 is operated, the pressing protrusions 221, which are respectively provided at the pair of wedge blocks 220, alternately press both end portions of the cam sleeve 210.

The wedge spring 230 has a circular shape so as to be fitted to the spring protrusion 152 of the socket 150 to be supported by the other side surface of the socket 150. Both end portions of the wedge spring 230 are bent toward the internal gear bracket 120 in an adjacent state of facing each other. Accordingly, both end portions of the wedge spring 230 are fitted between one end portions of the pair of wedge blocks 220 adjacent to each other so as to elastically push the respective wedge blocks 220 in a direction away from each other.

In this case, one end portion of each of the pair of wedge blocks 220 is elastically supported by the wedge spring 230 and the other end portion thereof is supported by the operation protrusion 153 of the socket 150. One end portions of the pair of wedge blocks 220 are formed with catching grooves so that both end portions of the wedge spring 230 are fitted to and caught by the catching grooves.

Meanwhile, the recliner according to the present invention includes a configuration capable of preventing a phenomenon, in which initial actuation force required when the wedge blocks are unlocked is rapidly increased, when a driver operates the recliner in order to adjust an angle of the seat back.

That is, in order for the initial actuation force to be not rapidly increased by continuously maintaining a predetermined gap between the pressing protrusion 221 of each wedge block 220 and the cam sleeve 210, the cam sleeve 210 has the protrusion portions 211 protruding toward the wedge blocks 220 from both end portions thereof and the groove portions 222 for movement of the protrusion portions 211 are formed on the inner peripheral surfaces of the pair of wedge blocks 220.

When the recliner 100 is operated to adjust the angle of the seat back, the protrusion portions 211 of the cam sleeve 210 are fitted to the groove portions 222 of the wedge blocks 220 so as to move in the groove portions 222. Specifically, when the recliner 100 is operated, it is configured such that upper end surfaces of the protrusion portions 211 of the cam sleeve 210 are pressed by upper end surfaces of the groove portions 222 or lower end surfaces of the protrusion portions 211 are pressed by lower end surfaces of the groove portions 222.

The protrusion portions 211 protrude toward the inner peripheral surfaces of the wedge blocks 220 on outer peripheral surfaces of both end portions of the cam sleeve 210.

The groove portions 222 are respectively formed adjacent to the pressing protrusions 221 of the wedge blocks 220 supported by the operation protrusion 153. Each of the groove portions 222 is formed as a slot groove having a certain length such that the associated protrusion portion 211 is fitted to the groove portion 222 formed toward the central protrusion 121 so as to be moved in the groove portion 222.

Here, in a state before the recliner 100 is operated, a position of the protrusion portion 211 fitted to the groove portion 222 becomes a state (hereinafter, referred to as "a reference state") as shown in FIG. 4. In this reference state, when an angle between an upper side of the protrusion portion 211 and an upper side of the groove portion 222 refers to "$a_1$" and an angle between a lower side of the protrusion portion 211 and a lower side of the groove portion 222 refers to "$a_2$", it is configured to satisfy $a_1 < a_2$.

That is, in the reference state of the recliner 100 as shown in FIG. 4, when the recliner 100 is operated, the left wedge block 200 is rotated in a clockwise direction by the clockwise rotation of the socket 150 and the right wedge block 220 is also pressed in the clockwise direction by elastic force of the wedge spring 230.

As a result, as shown in FIG. 5, before the cam sleeve 210 comes into contact with a lower side surface of the groove portion 222 of the left wedge block 220, an upper side surface of the protrusion portion 211 of the cam sleeve 210 is contact with an upper side surface of the groove portion 222 of the right wedge block 220.

In this case, the cam sleeve 210 is rotated together with the right wedge block 220 by pressing the upper side surface of the protrusion portion 211 of the cam sleeve 210 by the upper side surface of the groove portion 222 of the right wedge block 220.

On the contrary, even when operation force applied to the socket is released in a case in which the gap between the lower side surface of the groove portion 222 of the left wedge block 220 and a left end portion of the cam sleeve 210 is not present due to use of the recliner 100 for a long time as shown in FIG. 7, the recliner 100 according to the present invention is configured by the above-mentioned configuration as follows: uniform gaps are always present between the both end portions of the cam sleeve and the pressing protrusions 221 of the wedge blocks 220, respectively.

That is, as shown in FIG. 7, in a state in which the lower side surface of the groove portion 222 of the left wedge block 220 comes into contact with the left end portion of the cam sleeve 210, when the operation of the recliner 100 is stopped and the input of the operation force is released, the pair of wedge blocks 220 is pressed in a direction away from each other by restoring force of the wedge spring 230. Consequently, the left wedge block 220 is moved in the counterclockwise direction and the right wedge block 220 is moved in the clockwise direction.

In this case, while the right wedge block 220 is moved in the clockwise direction, the upper side surface of the protrusion portion 211 provided at the right end portion of the cam sleeve 210 comes into contact with the upper side surface of the groove portion 222 of the right wedge block 220 to be subjected to force moved in the clockwise direction similarly to the right wedge block 220.

Accordingly, as the cam sleeve 210 is moved in the clockwise direction by action of the wedge spring 230 and the right wedge block 220 and the left wedge block 220 is moved in the counterclockwise direction, the contact between the left end portion of the cam sleeve 210 and the pressing protrusion 221 of the left wedge block 220, which are contact with each other, is released and the movement of the pair of wedge blocks 220 is stopped. Consequently, a predetermined gap is finally formed between the left end portion of the cam sleeve 210 and the pressing protrusion 221 of the left wedge block 220.

Here, the predetermined gap may be set such that the angle $a_2$ between the lower side surface of the protrusion portion 211 and the lower side surface of the groove portion 222 is greater than the angle $a_1$ between the upper side surface of the protrusion portion 211 and the upper side surface of the groove portion 222.

In this case, by rotating the cam sleeve 210 such that the upper side surface of the groove portion 222 of the right wedge block 220 presses the upper side surface of the protrusion portion 211 provided at the right end portion of the cam sleeve 210 and thus by allowing a gap corresponding to a difference of the angles $a_1$ and $a_2$ to be at least formed between the pressing protrusion 221 of the left wedge block 220 and the left end portion of the cam sleeve 210, it may be possible to transmit initial actuation force required when the socket is operated to again adjust the angle of the seat back only to the wedge blocks 220. Therefore, it may be possible to prevent a conventional phenomenon in which initial actuation force is rapidly increased.

Although the actuation force has been described to be applied to the wedge blocks 220 and the cam sleeve 210 through the socket in the clockwise direction, the present invention is not limited thereto. For example, on the contrary, even when the actuation force is applied to the wedge blocks 220 and the cam sleeve 210 in the counterclockwise direction, a predetermined gap may be configured to be continuously present between the pressing protrusion 221 of the wedge block 220 and the cam sleeve 210 in the same manner as described above. No description will be given thereof.

As is apparent from the above description, a recliner for a vehicle seat according to the present invention may prevent a phenomenon in which initial actuation force required when wedge blocks are unlocked in order to adjust an angle of a seat back is rapidly increased since a predetermined gap is continuously present between a cam sleeve and a pressing protrusion of each of the wedge blocks pressed by an operation protrusion of a socket during operation of the recliner.

While the present invention has been described with respect to the specific embodiments, it will be apparent to those skilled in the art that various changes and modifications may be made without departing from the spirit and scope of the invention as defined in the following claims.

What is claimed is:

1. A recliner for a vehicle seat, comprising:
   an external gear bracket formed with a through-hole to which a bush is fitted and coupled, the external gear bracket having an external gear;
   an internal gear bracket which has an internal gear engaging with the external gear and is formed with a central protrusion protruding toward the external gear bracket, a shaft passing through the central protrusion;
   a socket provided with a socket protrusion to which the shaft is spline-coupled, and provided with an operation protrusion which protrudes to surround a portion of an outer peripheral surface of the central protrusion, wherein the socket protrusion is formed toward the internal gear bracket;
   a cam sleeve configured to surround a portion of the remainder of the outer peripheral surface of the central protrusion; and
   a pair of wedge blocks configured to surround a portion of the outer peripheral surface of the central protrusion in a state in which one end portions of the respective wedge blocks face each other and the other end portions thereof are pressed by the operation protrusion,
   wherein the cam sleeve comprises protrusion portions protruding from both end portions thereof toward the wedge blocks,
   wherein the pair of wedge blocks comprises groove portions in which the protrusion portions are moved on inner peripheral surfaces adjacent to the other respective end portions, and
   wherein, when a pressing force by the operation protrusion is released, a predetermined gap is each formed between lower side surfaces of the groove portions and lower side surfaces of the protrusion portions of the cam sleeve.

2. The recliner according to claim 1, wherein in a state of being assembled to a vehicle, a first angle ($a_1$) between an upper side surface of each of the protrusion portions and an upper side surface of each of the groove portions and a second angle ($a_2$) between a lower side of the protrusion portion and a lower side of the groove portion, the second angle is greater than the first angle.

3. The recliner according to claim 2, wherein the predetermined gap is equal to or greater than a difference of the first angle ($a_1$) and the second angle ($a_2$).

4. The recliner according to claim 1, wherein the recliner is configured such that, when any one of the pair of wedge blocks is pressed by the operation protrusion during rotation of the socket, the groove portion of the other wedge block presses the associated protrusion portion of the cam sleeve before the one wedge block presses the cam sleeve.

* * * * *